(12) United States Patent
Kono et al.

(10) Patent No.: US 8,645,962 B2
(45) Date of Patent: Feb. 4, 2014

(54) INSTRUCTION GENERATING APPARATUS INCLUDING A RECEIVING SECTION, A DETERMINING SECTION, AND A GENERATION SECTION, DOCUMENT PROCESSING SYSTEM, AND A COMPUTER READABLE MEDIUM

(75) Inventors: Daisuke Kono, Kawasaki (JP); Akira Hirose, Kawasaki (JP); Tohru Mori, Kawasaki (JP); Atsushi Monna, Kawasaki (JP); Kazushi Kaneshiro, Kawasaki (JP); Tomonari Yamauchi, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1225 days.

(21) Appl. No.: 12/103,051

(22) Filed: Apr. 15, 2008

(65) Prior Publication Data

US 2009/0064146 A1    Mar. 5, 2009

(30) Foreign Application Priority Data

Aug. 27, 2007  (JP) ................................. 2007-219558

(51) Int. Cl.
*G06F 3/12*    (2006.01)
(52) U.S. Cl.
USPC .......................................... 718/102; 717/106
(58) Field of Classification Search
None
See application file for complete search history.

(56) References Cited

U.S. PATENT DOCUMENTS

| | | | | |
|---|---|---|---|---|
| 5,623,653 A | * | 4/1997 | Matsuno et al. ...................... 1/1 |
| 5,890,177 A | * | 3/1999 | Moody et al. ................. 715/210 |
| 7,411,692 B2 | * | 8/2008 | Ferlitsch ...................... 358/1.15 |
| 7,640,294 B2 | * | 12/2009 | Maekawa ...................... 709/203 |
| 2001/0010055 A1 | * | 7/2001 | Hirabayashi .................. 709/201 |
| 2004/0184080 A1 | * | 9/2004 | Gotoh et al. ................. 358/1.15 |
| 2004/0194010 A1 | | 9/2004 | Kirihara et al. |
| 2006/0007510 A1 | * | 1/2006 | Nishide et al. ................ 358/518 |
| 2006/0039029 A1 | * | 2/2006 | Yagita .......................... 358/1.15 |
| 2006/0055974 A1 | * | 3/2006 | Yamaguchi ................... 358/1.16 |
| 2006/0271936 A1 | * | 11/2006 | Matsuda et al. .............. 718/102 |
| 2007/0103724 A1 | * | 5/2007 | Jeyachandran et al. ...... 358/1.15 |
| 2007/0171454 A1 | * | 7/2007 | Takahashi et al. ........... 358/1.14 |
| 2008/0010360 A1 | * | 1/2008 | Kraslavsky ................... 709/217 |

FOREIGN PATENT DOCUMENTS

| | | |
|---|---|---|
| JP | 2004-287859 A | 10/2004 |
| JP | 2005-275476 A | 10/2005 |
| JP | 2005-316904 A | 11/2005 |
| JP | 2006-215853 A | 8/2006 |
| JP | 2006-285473 A | 10/2006 |
| JP | 2007-166426 A | 6/2007 |

OTHER PUBLICATIONS

Japanese Notification of Reasons for Refusal dated Oct. 20, 2009 in Japanese Application No. 2007-219558.

* cited by examiner

*Primary Examiner* — Eric Coleman
(74) *Attorney, Agent, or Firm* — Sughrue Mion, PLLC

(57) ABSTRACT

An instruction generating apparatus includes a receiving section and a generating section. The receiving section receives job information including a plurality of jobs determined in a given order. Each job includes a process of a document by a processing device. The generating section generates instruction information based on the job information received by the receiving section. The instruction information includes, in the given order, a plurality of sets of (i) document corresponding to each job and (ii) detailed process of the document so as to instruct the processing device to perform each document process.

7 Claims, 12 Drawing Sheets

FIG. 7

| 211 | DRAFT CONTROL | APPROVAL CONTROL | REQUEST CONTROL | ORDER CONTROL | RECEIVING CONTROL | PROVIDER CONTROL |
|---|---|---|---|---|---|---|
| (a) BE INPUT FROM THE COMPANY | ○ | ○ | ○ | ○ | — | — |
| (b) BE OUTPUT TO THE COMPANY | — | ○ | — | — | — | — |
| (c) BE INPUT FROM THE OUTSIDE OF THE COMPANY | — | — | — | — | ○ | — |
| (d) BE OUTPUT FROM THE COMPANY | — | — | — | ○ | ○ | — |
| (e) APPROVAL OCCURS | — | ○ | ○ | — | — | — |
| (f) BE STARTED | ○ | — | — | — | — | — |
| (g) BE ENDED | — | — | — | — | — | — |
| (h) OUTSIDE THE COMPANY | — | — | — | — | — | ○ |

2110

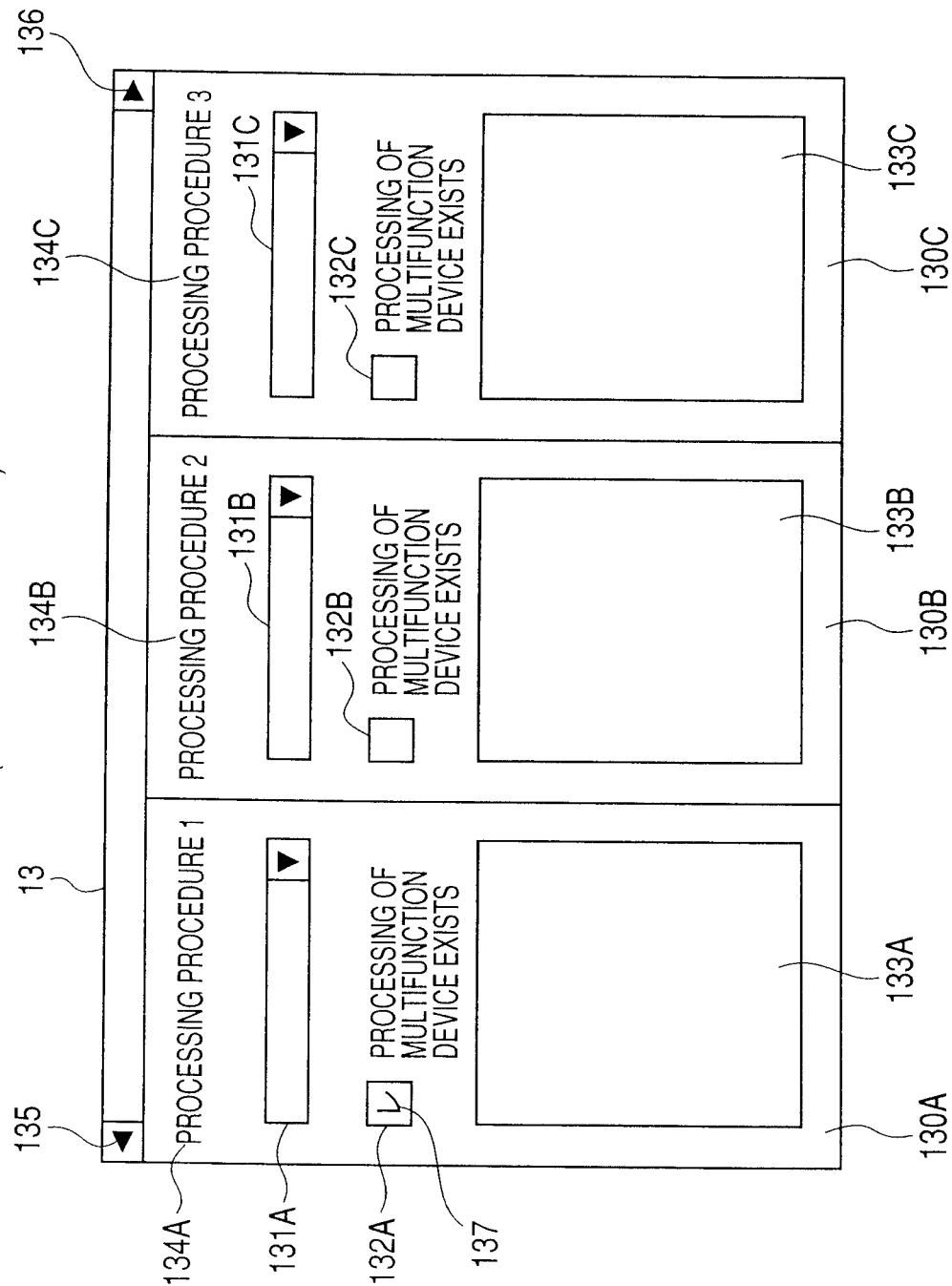

INSTRUCTION GENERATING APPARATUS INCLUDING A RECEIVING SECTION, A DETERMINING SECTION, AND A GENERATION SECTION, DOCUMENT PROCESSING SYSTEM, AND A COMPUTER READABLE MEDIUM

CROSS-REFERENCE TO RELATED APPLICATIONS

This application is based on and claims priority under 35 USC 119 from Japanese Patent Application No. 2007-219558 filed Aug. 27, 2007.

BACKGROUND

Technical Field

The present invention relates to an instruction generating apparatus, a document processing system and a computer readable medium.

SUMMARY

According to an aspect of the invention, an instruction generating apparatus includes a receiving section and a generating section. The receiving section receives job information including a plurality of jobs determined in a given order. Each job includes a process of a document by a processing device. The generating section generates instruction information based on the job information received by the receiving section. The instruction information includes, in the given order, a plurality of sets of (i) document corresponding to each job and (ii) detailed process of the document so as to instruct the processing device to perform each document process.

BRIEF DESCRIPTION OF THE DRAWINGS

Exemplary embodiment(s) of the present invention will be described in detail based on the following figures, wherein

FIG. 7 is a diagram illustrating a property table associated with job controls;

FIG. 12 is a diagram illustrating a modified example of the instruction generating picture.

DETAILED DESCRIPTION

Figure 1:
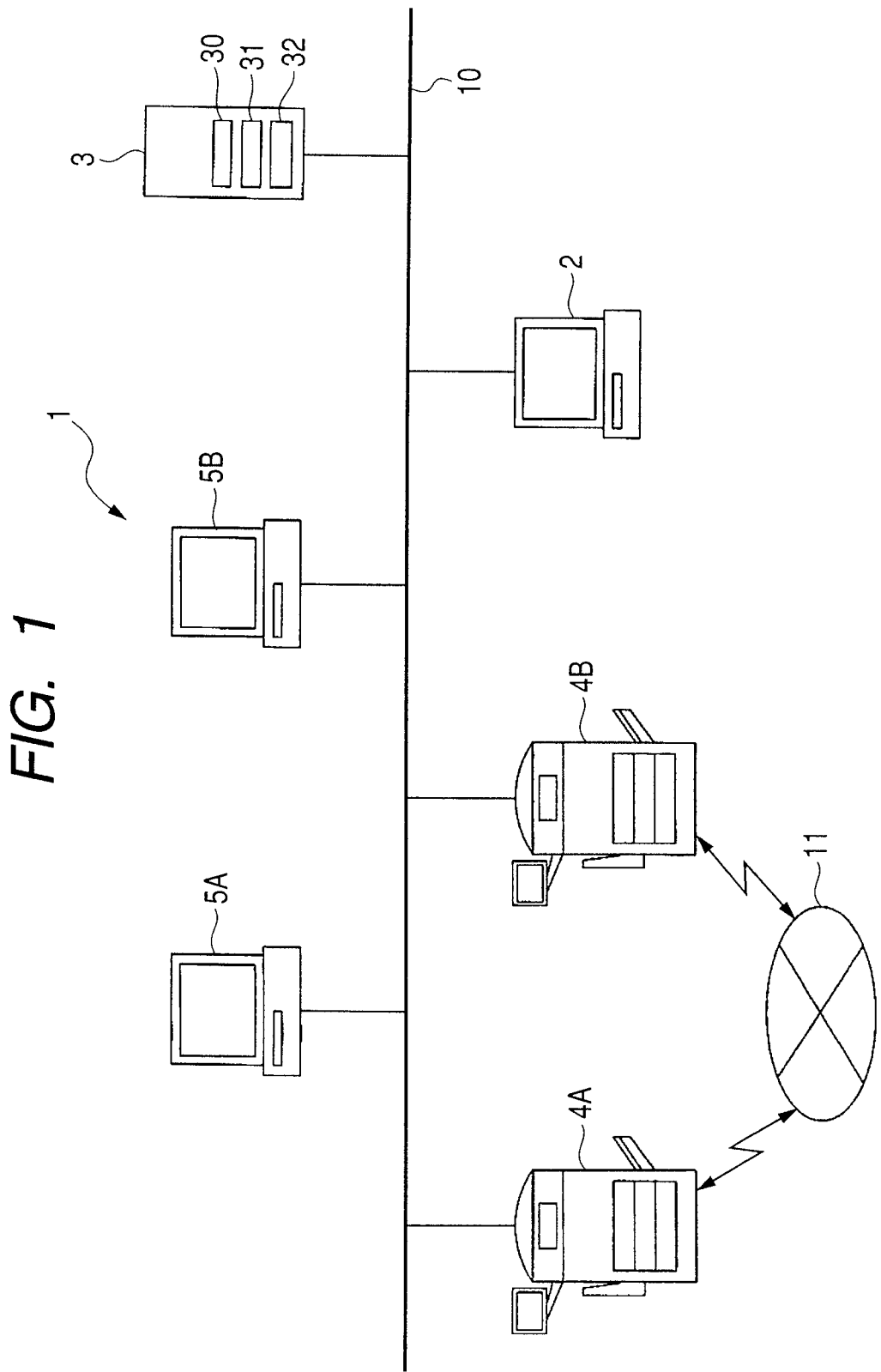
FIG. 1 is a diagram schematically illustrating an entire configuration of a document processing system according to an exemplary embodiment of the invention.

FIG. 1 is a diagram schematically illustrating an example of a document processing system according to an exemplary embodiment of the invention. The document processing system 1 includes an instruction generating apparatus 2 generating instruction information 30 on the basis of job information in which plural jobs are determined in a given order, first and second multifunction devices 4A and 4B processing documents corresponding to the jobs, first and second terminals 5A and 5B employed for persons in charge of the jobs to execute the jobs, a document management server 3 instructing the first and second multifunction device 4A and 4B and the first and second terminals 5A and 5B to perform processes based on the generated instruction information 30, and a network 10 connecting them to each other.

Here, the "job information" means information in which plural jobs accompanying the document processes of the first and second multifunction devices 4A and 4B are determined in a given order. The given order includes a procedure of performing plural jobs in time series and a procedure of performing plural job in parallel.

The "instruction information" means information includes sets of (i) document corresponding to each job of the plural jobs and (ii) detailed process of the document are written in a given order based on the job information and serves to instruct the first and second multifunction devices 4A and 4B to process the documents.

In FIG. 1, the number of multifunction devices and the number of terminals are 2, respectively, but may be 1 or 3 or more.

The network 10 is a local area network such as a wired LAN and a wireless LAN. It may be a network connected to the Internet.

(Multifunction Device)

The first and second multifunction devices 4A and 4B have plural functions of copy, print, scan, facsimile, and the like and process documents corresponding to the jobs. The devices may be constructed to form a system out of devices having a single function, such as a scanner and a facsimile.

The first and second multifunction devices 4A and 4B includes a control unit embodied by, for example, a CPU controlling the units of the multifunction devices 4A and 4B, a memory unit embodied by a ROM, a RAM, and a hard disk storing a variety of programs and data, a reading unit optically reading documents, a printing unit of an electrophotographic type or an ink jet type printing documents, a network communication unit embodied by, for example, a network interface card connected to the network 10, and a facsimile communication unit connected to a telephone network 11, these units which are connected to each other through a bus.

(Terminal)

The first and second terminals 5A and 5B include, for example, a personal computer (PC), a personal digital assistant (PDA), and the like, and includes a control unit embodied by, for example, a CPU controlling the units of the terminals 5A and 5B, a memory unit embodied by a ROM, a RAM, and a hard disk storing a variety of programs and data, a communication unit embodied by, for example, a network interface card connected to the network 10 to transmit and receive data, an input unit having a keyboard, a mouse, and the like receiving an operation instruction, and a display unit embodied by a liquid crystal display displaying documents corresponding to the jobs or processing results of the control unit.

(Document Management Server)

The document management server 3 includes a control unit embodied by, for example, a CPU controlling the units of the document management server 3, a memory unit embodied by a ROM, a RAM, and a hard disk storing a variety of programs and data, and a communication unit embodied by, for example, a network interface card connected to the network 10 to transmit and receive data. The document management server 3 may be embodied by, for example, a server, a personal computer (PC), or a work station (WS).

The memory unit of the document management server 3 stores instruction information 30 generated by the instruction generating apparatus 2, document data 31 corresponding to the jobs, and an instruction executing program 32 for performing the processes based on the instruction information 30.

The document management server 3 serves for analyzing the detailed processes and the processing procedure of the processing device included in the instruction information 30 by operating in accordance with the instruction executing program 32, or for instructing the first and second multifunction devices 4A and 4B as the processing devices to perform the detailed processes in accordance with the processing order based on the analyzed processing details and the analyzed processing order through the network 10.

(Instruction Generating Apparatus)

Figure 2:
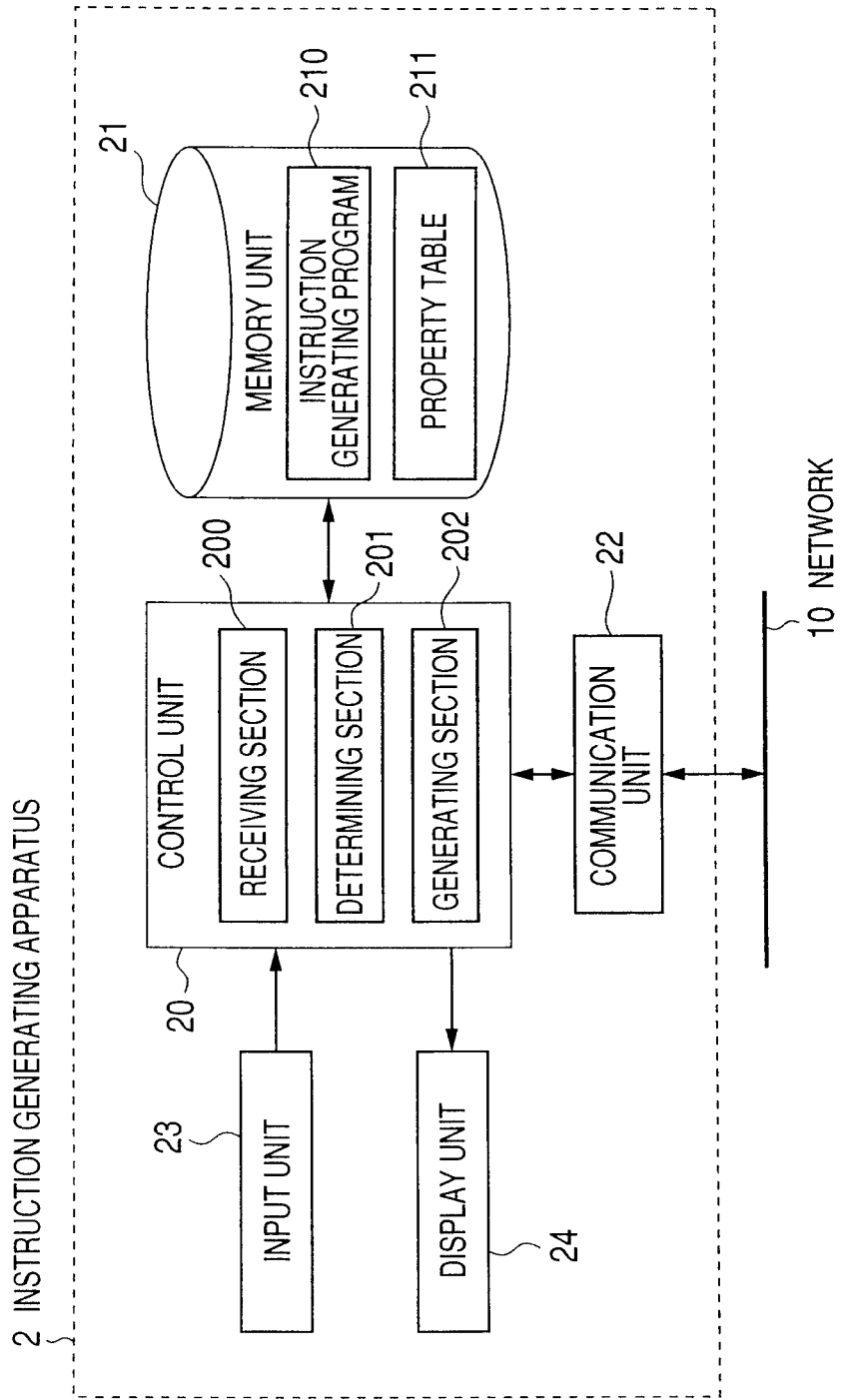
FIG. 2 is a block diagram schematically illustrating a configuration of an instruction generating apparatus according to an exemplary embodiment of the invention.

FIG. 2 is a block diagram schematically illustrating a configuration of the instruction generating apparatus 2. The instruction generating apparatus 2 includes a control unit 20 embodied by, for example, a CPU controlling the units of the instruction generating apparatus 2, a memory unit 21 embodied by a ROM, a RAM, and a hard disk storing programs such as an instruction generating program 210 and data of a condition table 211, a communication unit 22 embodied by, for example, a network interface card connected to the network 10 to transmit and receive data, an input unit 23 having a keyboard, a mouse, and the like receiving an operation instruction, and a display unit 24 embodied by a liquid crystal display displaying a picture for inputting instruction information or the processing result of the control unit 20. The details of the condition table 211 will be described later.

The control unit 20 serves as receiving section 200 for receiving job information in which plural jobs accompanying the processing of documents are determined in a given order, determining section 201 for determining the detailed processing of the documents based on the job information received by the receiving section 200, and generating section 202 for generating instruction information in which the detailed processing of the documents determined by the determining section 201 are recorded to be processed in the given order by the first and second multifunction devices 4A and 4B, by operating in accordance with the instruction generating program 210 stored in the memory unit 21.

(Operations in Exemplary Embodiment)

An operation of the document processing system 1 according to an exemplary embodiment of the invention will be described now with reference to FIGS. 3 to 11.

(1) Arrangement of Job Control

First, when a user instructs the instruction generating apparatus 2 to generate instruction information through the input unit 23, the receiving section 200 receives the instruction and causes the display unit 24 to display an instruction generating picture for generating the instruction information.

Figure 3:
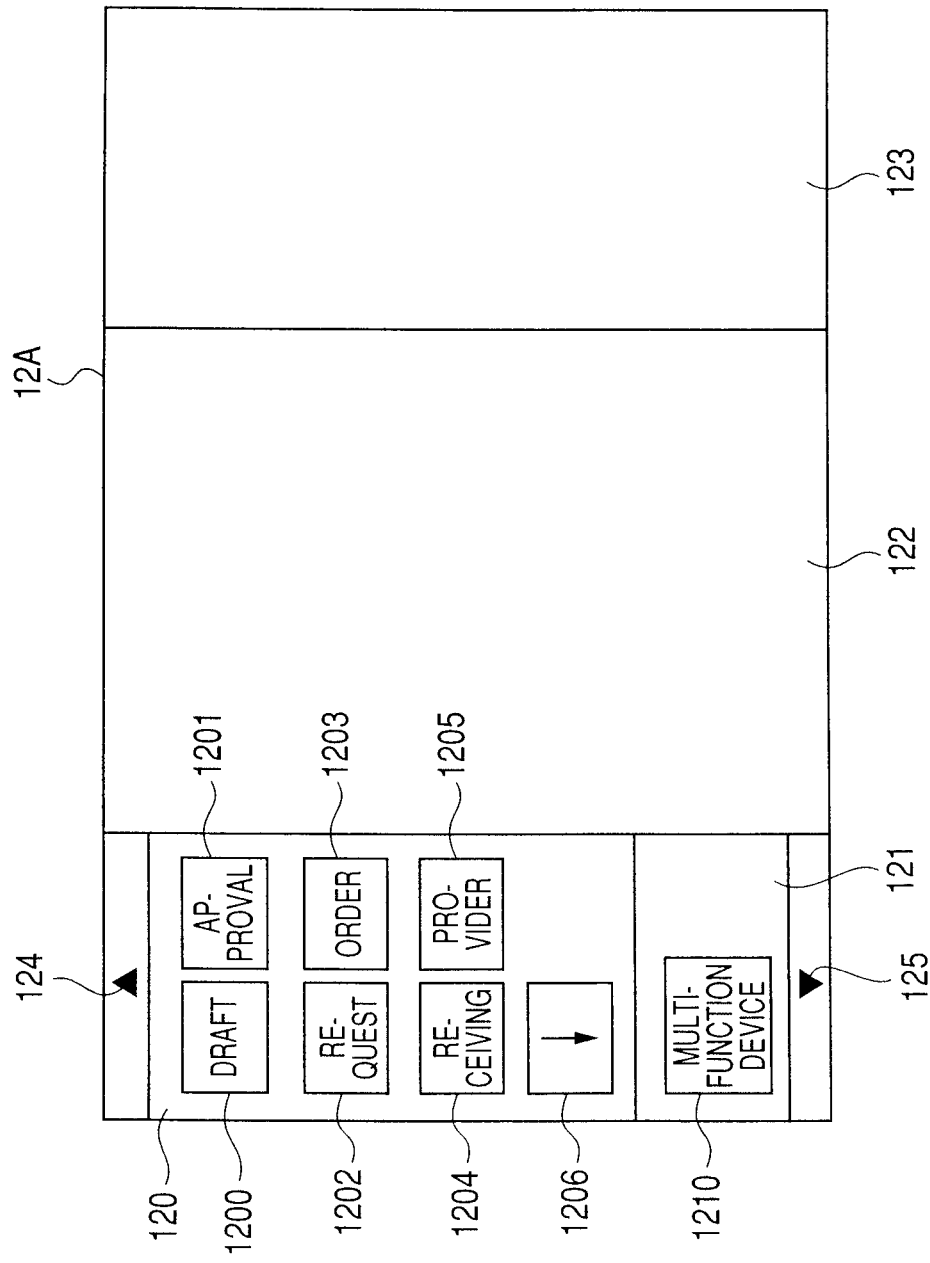
FIG. 3 is a diagram illustrating an instruction generating picture displayed in the instruction generating apparatus.

Here, FIG. 3 is a diagram illustrating an example of the instruction generating picture 12A displayed on the display unit 24. The instruction generating picture 12A has 4 panes as divided areas of the entire picture: that is, a job control pane 120 arranged at the left upper end of the picture, a multifunction device control pane 121 arranged at the left lower end, an edition pane 122 arranged at the center, and a property pane 123 arranged at the right end. The instruction generating picture 12A includes an upward button 124 and a downward button 125 for moving up and down the job control pane 120 and the multifunction device control pane 121.

In the job control pane 120, job controls indicating job items corresponding to the jobs such as a draft control 1200, an approval control 1201, a request control 1202, an order control 1203, a receiving control 1204, and a provider control 1205 and arrow controls 1206 for inputting a procedure relation of the job controls are displayed.

In the multifunction device control pane 121, a multifunction device control 1210 is displayed.

In the edition pane 122, the job controls in the job control pane 120 are arranged and the job controls are connected by the arrow controls 1206, whereby a workflow in which the plural jobs are determined in a given order is defined.

Properties as set information on the job controls and the multifunction device control 1210 displayed in the edition pane 122 are displayed in the property pane 123. The properties are displayed to be changed through the input unit 23 and may be set to initial values or may be empty.

The job property of a job control includes, for example, a title of the job, a person in charge of the job, a processing document name corresponding to the job, and a time limit of the job. In the control pane 120, a draft control having the same function as the draft control 1200 but having a specific person in charge designated in advance may be displayed, or plural controls having the same kind of detail information designated in advance may be displayed similarly to the other job controls.

The multifunction property of the multifunction device control 1210 includes detailed process of a function selected from plural functions of the multifunction device such as copy, print, scan, and facsimile, identification information such as an IP address for identifying a multifunction device performing the detailed process out of plural multifunction devices, and a variety of detail information corresponding to the detailed process.

When the detailed process indicates "print", the detail information indicates a designation of the number of printed matters and a one-sided print or a both-sided printing, for example. When the detailed process is "scan", the detail information indicates a document size and a resolution at the time of scanning. When the detail process indicates "facsimile", the detail information indicates a designation of a fax number of a destination and a transmission time. Similarly to the job controls, plural multifunction device controls 1210 may be displayed or a multifunction device control in which a predetermined multifunction device is designated by the identification information or given detailed processes or detail information of the detailed processes are designated in advance may be displayed in the multifunction device control pane 121.

Figure 4:
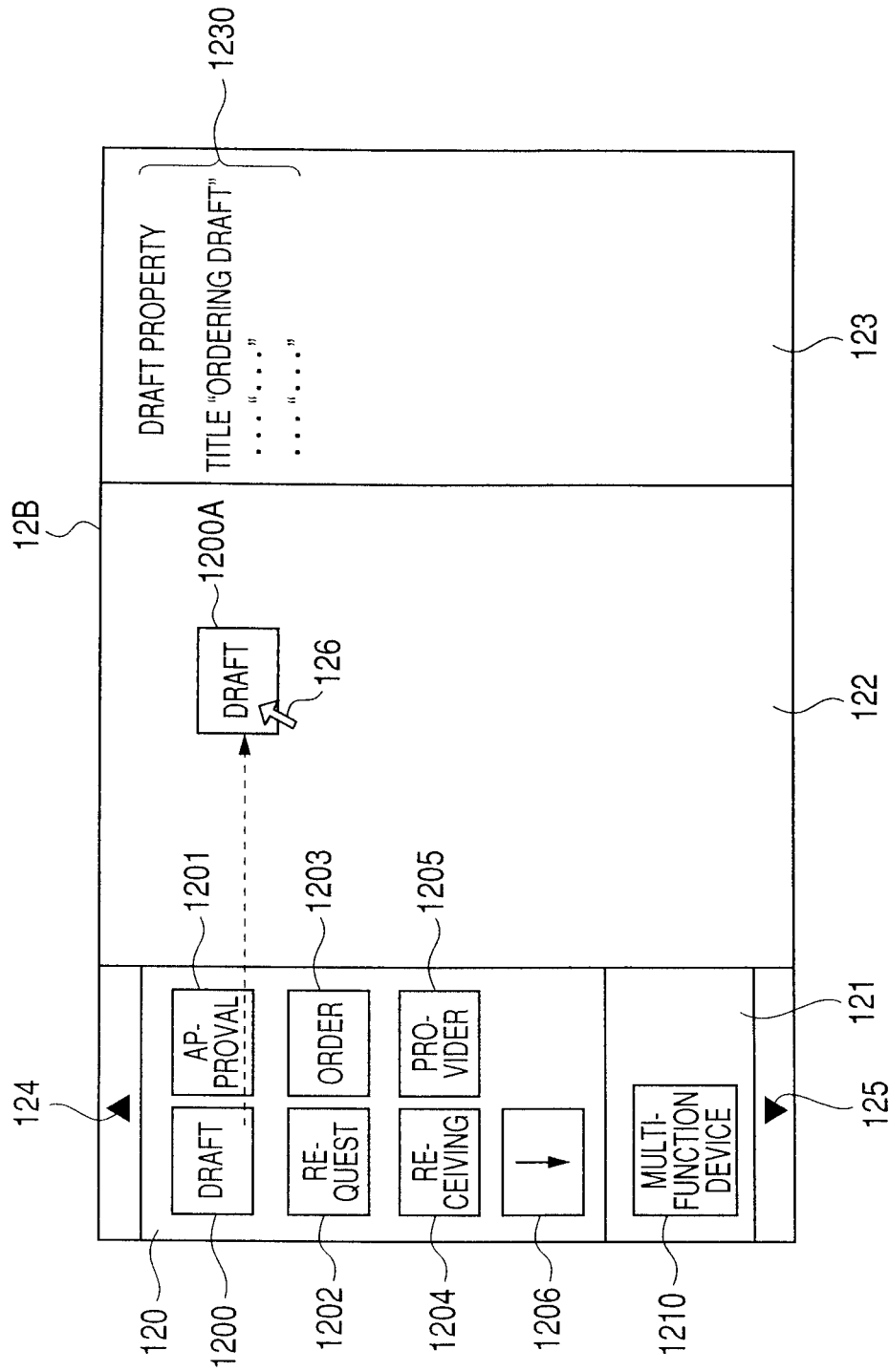
FIG. 4 is a diagram illustrating the instruction generating picture having a draft control arranged therein.

Next, as displayed in the instruction generating picture 12B shown in FIG. 4, the user operates a cursor 126 through the input unit 23 to arrange the draft control 1200 in the job control pane 120 in the edition pane 122 by the use of a drag-and-drop arranging operation. Then, the receiving section 200 receives the arranging operation as job information, displays the draft control 1200A in the edition pane 122, and displays the job property 1230 of the draft control 1200A in the property pane 123.

Next, the user inputs or changes the job property 1230 of the draft control 1200A, for example, the person in charge of the job or the processing document name, in the property pane 123 as needed.

Figure 5:
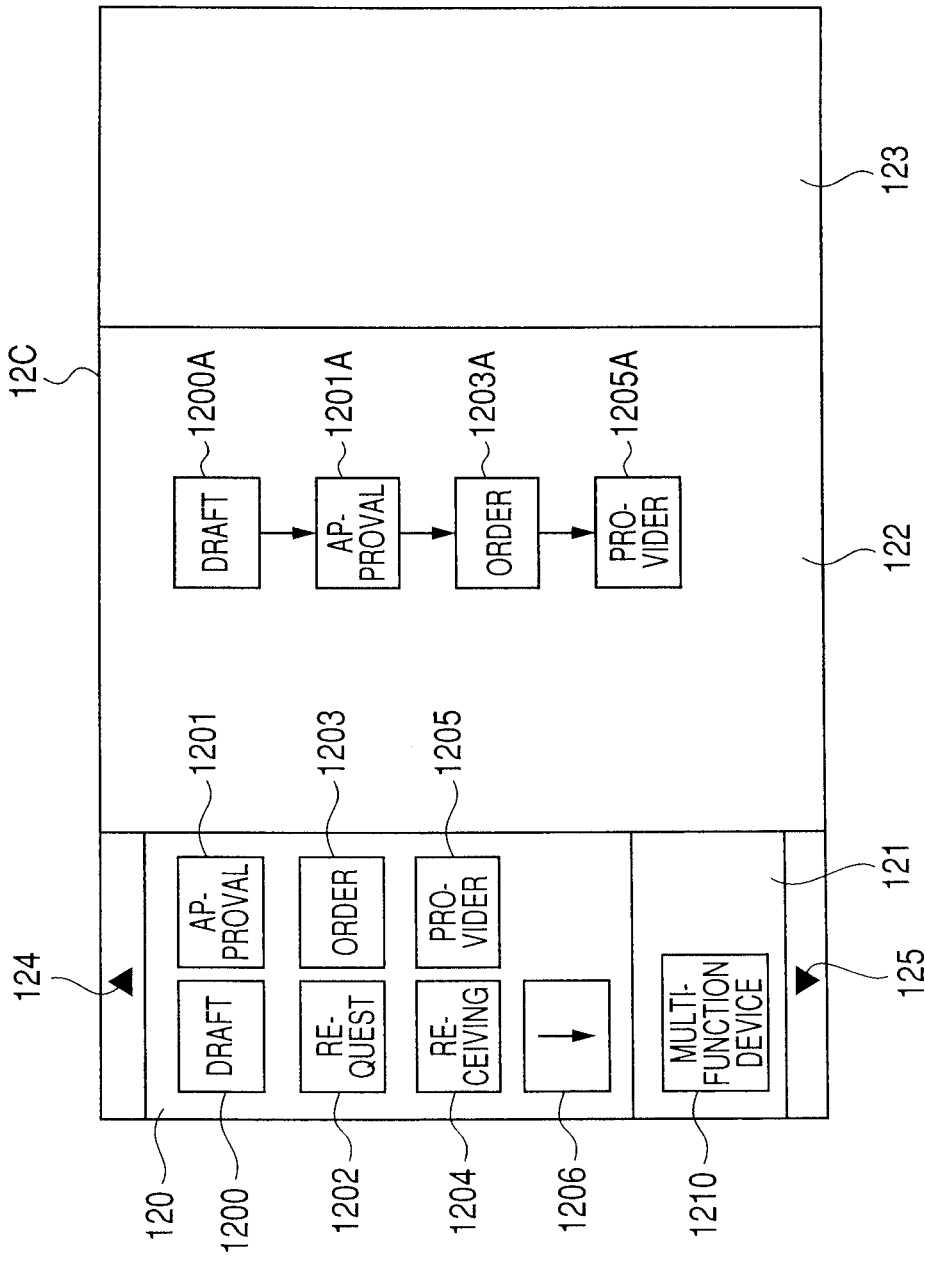
FIG. 5 is a diagram illustrating the instruction generating picture having plural job controls arranged therein.

The user arranges a variety of job controls or arrow controls 1206 in the edition pane 122 by repeating the drag-and-drop arranging operation, thereby preparing a workflow such as the instruction generating picture 12C shown in FIG. 5.

(2) Arrangement of Multifunction Device Control

The user arranges the multifunction device control 1210 of the multifunction device control pane 121 on the job control including the document processing of the multifunction device among the job controls displayed in the edition pane 122 by the use of the drag-and-drop arranging operation. Then, the receiving section 200 receives that the multifunction device 1210 is correlated with the job control from the arrangement operation.

Figure 6:
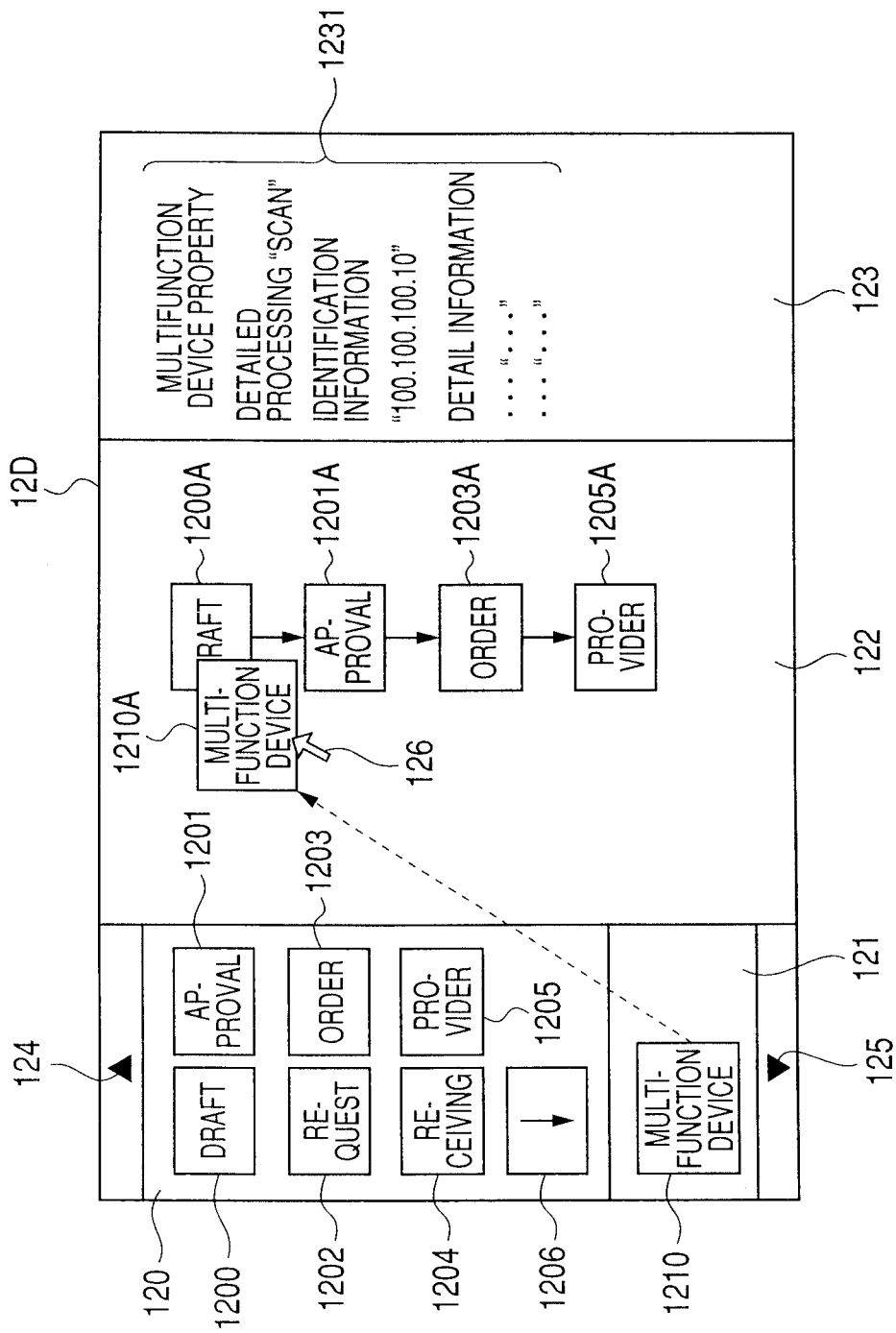
FIG. 6 is a diagram illustrating the instruction generating picture having a multifunction device control arranged therein.

FIG. 6 is a diagram illustrating an example of an instruction generating picture 12D in which the multifunction device control 1210A is arranged in the draft control 1200A. In the instruction generating picture 12D, in addition to the workflow of the edition pane 122 shown in FIG. 5, the multifunction device control 1210A correlated with the draft control 1200A by the arrangement operation is displayed and the multifunction device property 1231 of the multifunction device control 1210A is displayed in the property pane 123.

(2-A) Determination of Processing Details

Next, the determining section 201 determines the detailed process of the multifunction device control 1210 correlated with the job control. Now, an operation of allowing the determining section 201 to determine the detailed processing will be described with reference to the flowchart shown in FIG. 10.

First, the determining section 201 determines whether the multifunction device control 1210 is correlated with the job control (S100). For example, since the draft control 1200A shown in FIG. 6 is a job control, the determining section 201 determines that the multifunction device control 1210 is correlated with the job control (Yes in S100) and performs the subsequent step. On the other hand, when the determining section determines that the multifunction device control 1210 is not correlated with the job control (No in S100), the determining section 201 ends the procedure without determining the detailed processes.

Then, the determining section 201 determines the detailed processes of the multifunction device control 1210 with reference to the condition table 211 stored in the memory unit 21 based on the condition information of the job control (S101).

FIG. 7 is a diagram illustrating an example of the condition table 211. In the condition table 211, condition information of the job control is stored every job control and the condition information of the job control is indicated by a circle 2110.

For example, the draft control 1200A has the condition information of "(a) be input from the company" and "(f) be started" and the determining section 201 determines that "scan" of the plural functions of the multifunction device is proper detailed process based on the condition information.

Figure 8:
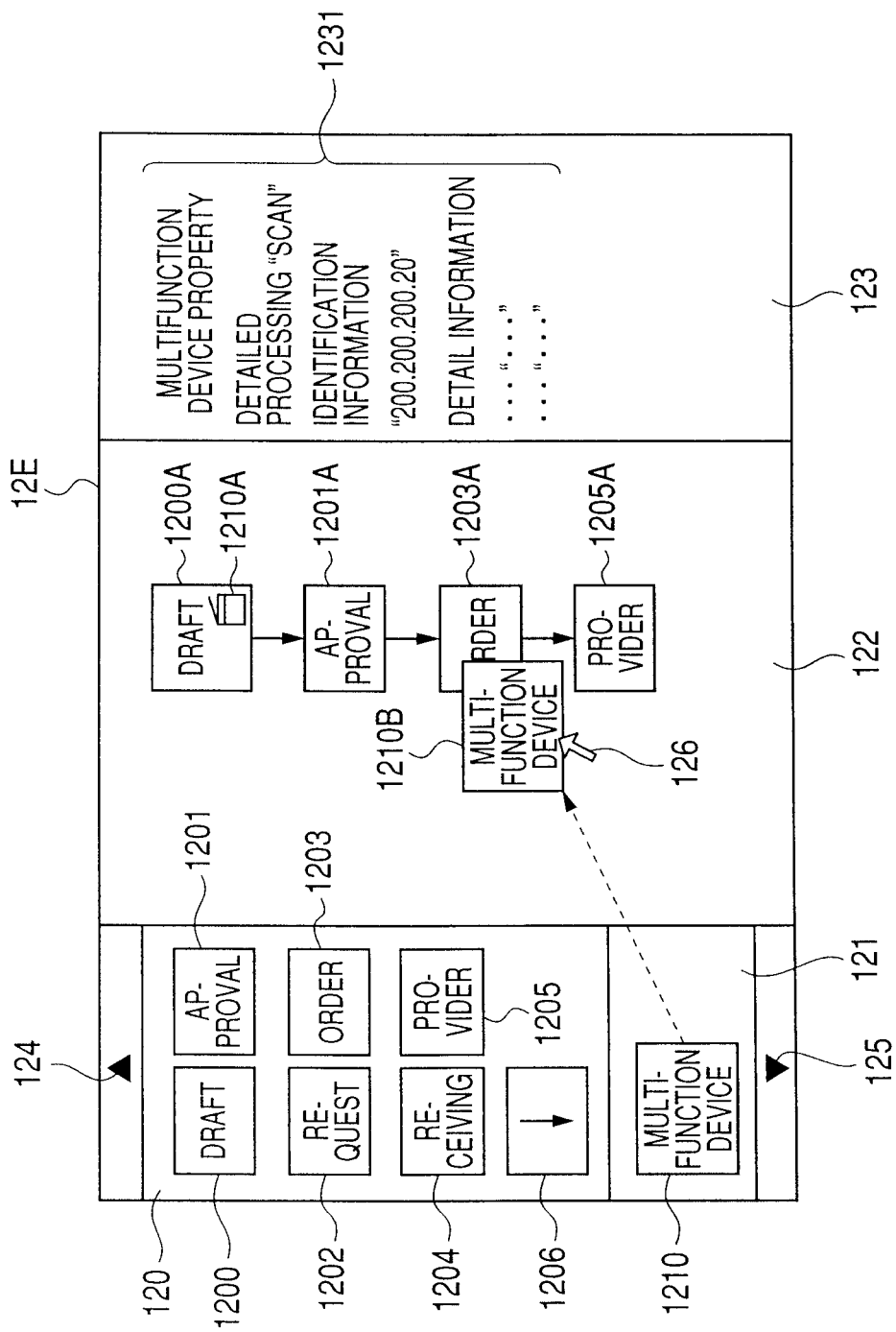
FIG. 8 is a diagram illustrating the instruction generating picture plural multifunction device controls.

As shown in the instruction generating picture 12E of FIG. 8, when the multifunction device control 1210B is correlated with the order control 1203A, the order control 1203A has the condition information of "(a) be input from the company" and "(d) be output from the company". For example, when "reception using facsimile is possible" is included in the job property of the provider control 1205A subsequent to the order control 1203B, the determining section 201 determines that the "reception using facsimile" is proper detailed process.

In addition to "reception using facsimile is possible" in the provider control 1205A, when "reception using E-mail is possible" is included in the job property of the provider control 1205A, the transmission method may be selected in accordance with the priority or the user may be allowed to select the transmission method from the display having such indication. The determining section 201 may determine the detailed processes of the multifunction device control 1210 based on the condition information of the job control arranged before the job control correlated with the multifunction device control 1210 of which the detailed processes are determined.

When the multifunction device control 1210 is correlated with the approval control 1201A, the approval control 1201A has the condition information of "(a) be input from the company", "(b) be output to the company", and "(e) approval occurs". Accordingly, the determining section 201 determines that "print" and "scan" are proper detailed processes.

When the multifunction device control 1210 is correlated with the request control 1202A, the request control 1202A has the condition information of "(a) be input from the company", "(b) be output to the company", and "(f) be started". Accordingly, the determining section 201 determines that the "transmission using facsimile" or the "transmission using E-mail" is proper detailed process.

When the multifunction device control 1210 is correlated with the receiving control 1204A, the receiving control 1204A has the condition information of "(b) be output to the company" and "(c) be input from the outside of the company". Accordingly, the determining section 201 determines that the "reception using facsimile" is proper detailed process.

Next, the determining section 201 displays the determined detailed processes in the property pane 123 and checks whether the detail information corresponding to the detailed processes is set (S102). When the detail information is not set, for example, a message including such indication is displayed on the display unit 24 to urge the necessary detail information to be set (S103).

When recognizing the message, the user inputs the necessary detail information. Next, when receiving the detail information input by the user, the determining section 201 displays the input detail information in the property pane 123 (S104).

(2-B) Determination of Multifunction Device to be Used

The determining section 201 determines the multifunction device to perform the detailed process of the multifunction device control 1210 determined in the above. An example of an operation of allowing the determining section 201 to determine the multifunction device to perform the detailed process will be described with reference to the flowchart shown in FIG. 11.

First, the determining section 201 displays a selection picture for allowing the user to select whether the detailed process should be performed by the multifunction device near the instruction generating apparatus 2 which is being operated by the user or by the multifunction device near the seat of the person in charge (S200).

The determining section 201 receives the user's selection operation in the selection picture and searches for a multifunction device existing in the same domain as the instruction generating apparatus 2 when the multifunction device near the instruction generating apparatus 2 is selected (Yes in S200) (S201). On the other hand, when the multifunction device near the person in charge (No in S200) is selected, a multifunction device existing in the same domain as the terminals 5A and 5B used by the person in charge is searched for (S202).

Figure 10:
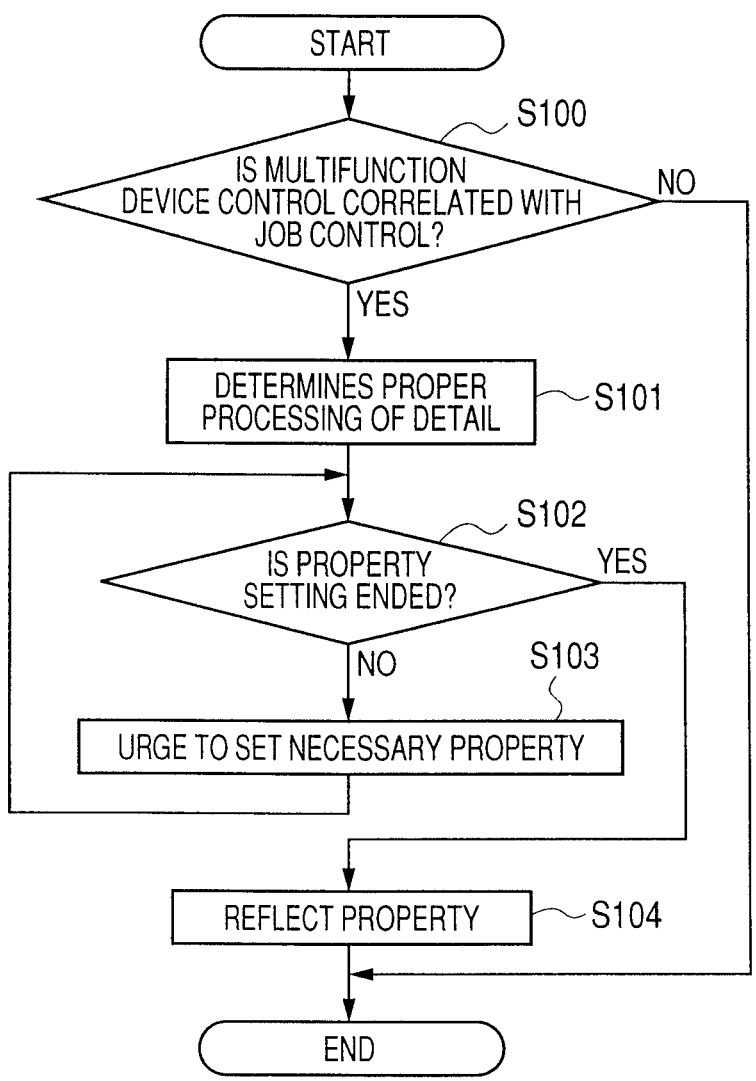
FIG. 10 is a diagram illustrating an operation of allowing the instruction generating apparatus to determine detailed process.
Figure 11:
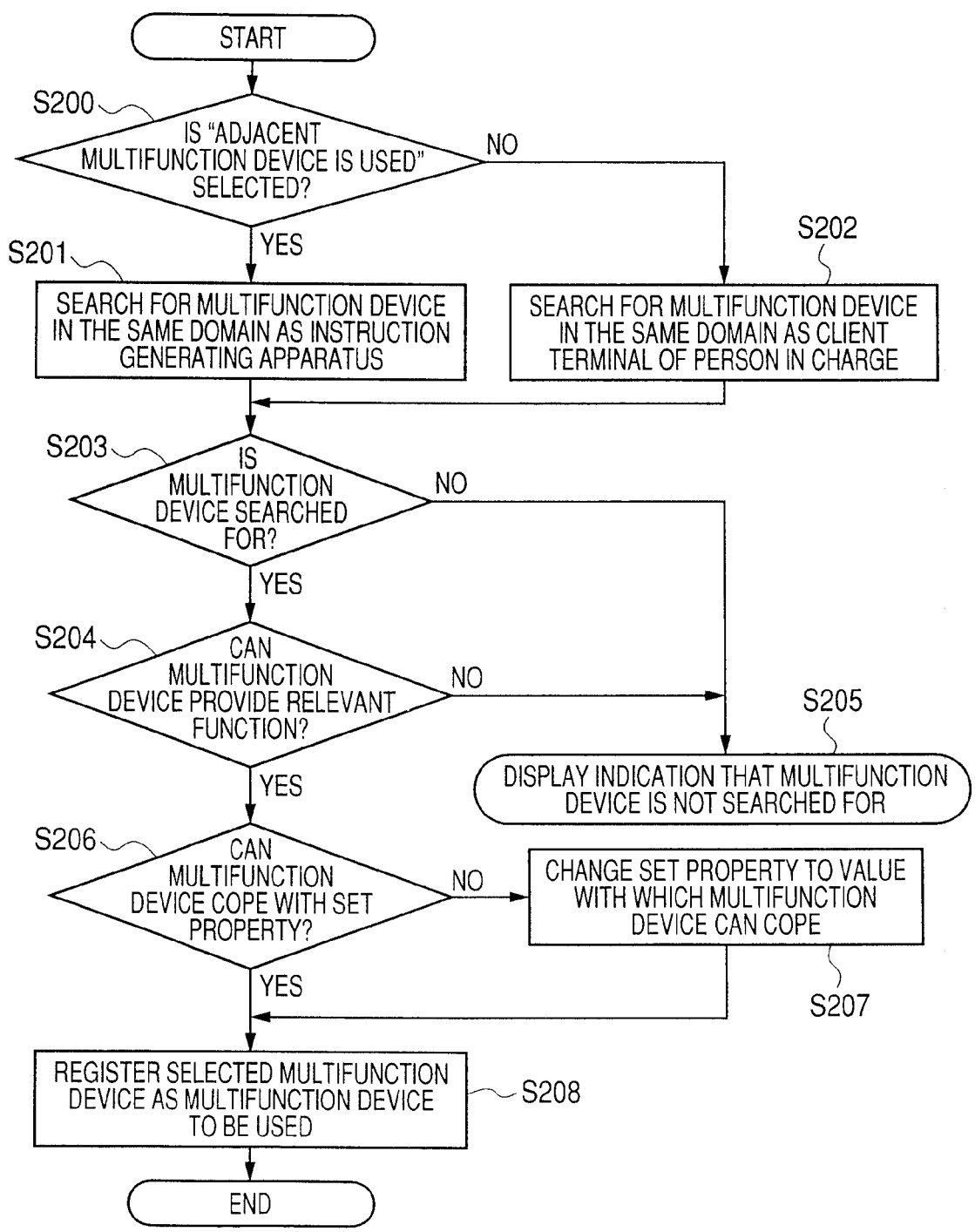
FIG. 11 is a diagram illustrating an operation of allowing the instruction generating apparatus to determine a multifunction device for processing.

When a multifunction device is searched for in steps S201 and S202 (Yes in S203), the determining section 201 determines whether the multifunction device is configured to perform the detailed processes determined by the flowchart shown in FIG. 10 (S204).

The detailed processes which may be performed by the multifunction device may be determined (i) with reference to a function table which is prepared in advance so as to list functions of the multifunction devices or (ii) based on the response results from multifunction devices obtained by inquiring of the multifunction devices whether they have the functions through the network 10.

When the multifunction device is not searched for (No in S203) or when the searched multifunction device cannot perform the detailed processes (No in S204), the determining section 201 displays a message indicating that the possible multifunction device is not searched for and ends the procedure.

On the other hand, when the determining section 201 determines that the searched-for multifunction device may perform the detailed processes (Yes in S204), the determining section 201 determines whether the multifunction device may cope with the detail information set in the property pane 123 (S206).

When the determining section 201 determines that the multifunction device cannot cope with the detail information set in the property pane 123 (No in S206), the determining section 201 changes the detail information to the detail information which can be processed by the searched-for multifunction device (S207). For example, when a color print is designated in the detail information but the searched-for multifunction device can perform a black and white printing operation, the detail information is changed to the black and white printing operation. When the detail information is changed, a message indicating the change may be displayed for the user.

When the determining section 201 determines that the multifunction device can cope with the detail information (Yes in S206), the determining section 201 determines the searched-for multifunction device as the multifunction device to perform the detailed processes without changing the detail information and displays the IP address of the multifunction device as the identification information in the property pane 123 (S208).

The user prepares a workflow in which the documents corresponding to the jobs should be processed by the multifunction device in a given order, as described above, by arranging the job controls and the multifunction device control 1210 in the edition pane 122 and inputting the properties of the job controls and the multifunction control 1210 as needed.

(3) Generation of Instruction Information

When the user instructs to generate the instruction information in the prepared workflow through the input unit 23, the generating section 202 prepares the instruction information 30 based on the workflow displayed in the edition pane 122. The generating section 202 transmits the prepared instruction information 30 to the document management server 3 through the network 10 and the document management server 3 stores the transmitted instruction information 30 in the memory unit.

Figure 9:
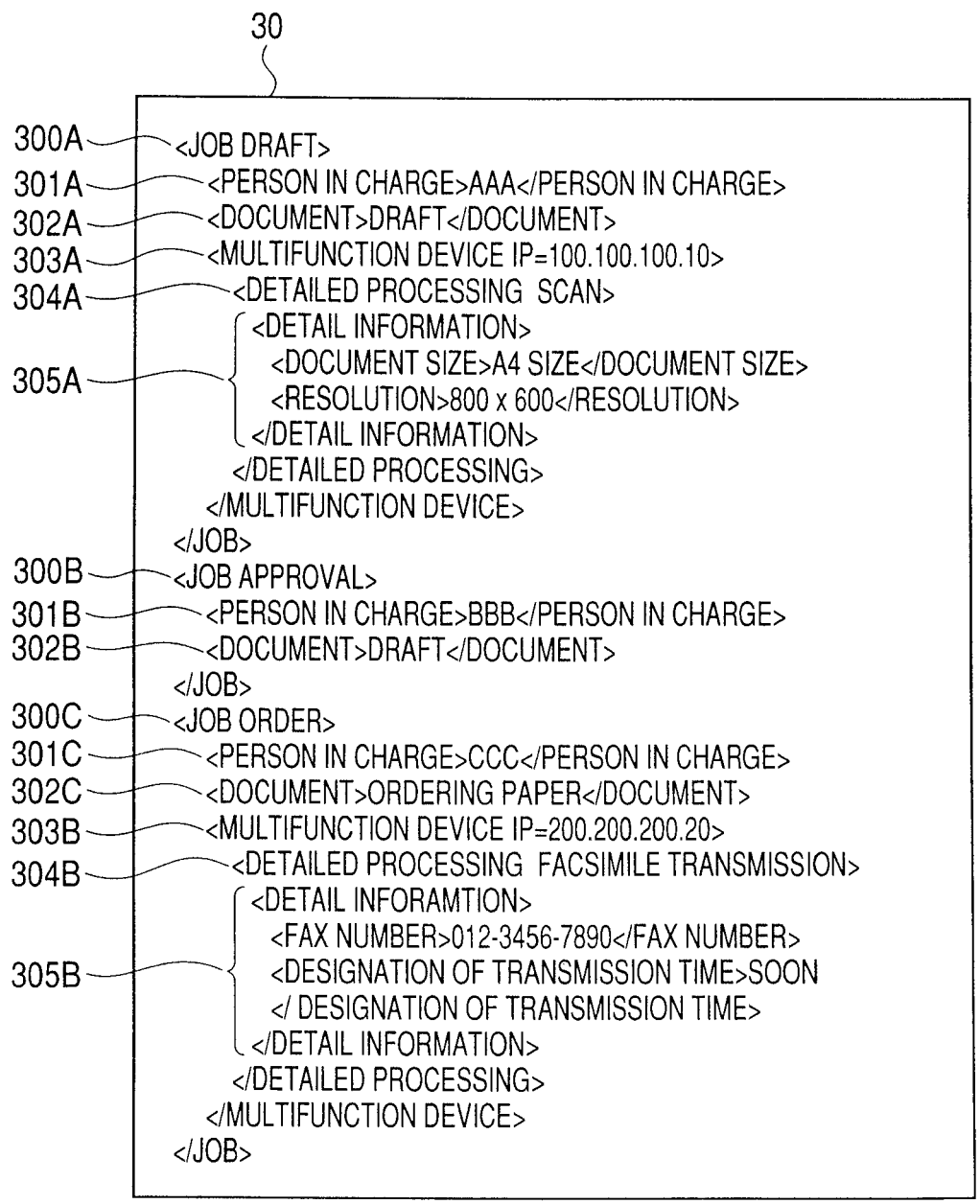
FIG. 9 is a diagram illustrating instruction information generated by the instruction generating apparatus.

FIG. 9 shows an example of the instruction information generated by the generating section 202. The instruction information 30 is written in a structured language such as XML (Extensible Markup Language), HTML (Hyper Text Markup Language), XHTML (Extensible Hyper Text Markup Language), and SGML (Standard Generalized Markup Language).

In the instruction information 30 shown in FIG. 9, job details 300A to 300C indicating the jobs, person-in-charge information 301A to 301C indicating persons in charge of the jobs, document information 302A to 302C indicating the processing documents of the jobs, identification information 303A and 303B indicating the multifunction devices determined by the determining section 201, detailed processes 304A and 304B to be performed by the multifunction devices, and detail information 305A and 305B corresponding to the detailed processes are recorded so as to be processed by the first and second multifunction devices 4A and 4B in a predetermined order.

(4) Execution of Instruction Information

An example of an operation of processing the instruction information generated by the instruction generating apparatus 2 in the document processing system 1 will be described. Here, with reference to the workflow shown in FIG. 8, a case where a drafter preparing a draft uses the first multifunction device 4A, an approver approving the draft uses the first terminal 5A, and an orderer based on the draft uses the second multifunction device 4B will be described.

First, the drafter writes the ordered materials or the number of materials in the draft having a given format and gives a scan instruction to allow the first multifunction device 4A to read the draft and a start instruction to start the workflow shown in FIG. 8.

Then, when the first multifunction device 4A receives the scan instruction and the start instruction thereafter reads the draft, the first multifunction device 4A generates the document data 31 from the read draft and transmits the document data 31 and the start instruction to the document management server 3.

When the document management server 3 receives the document data 31 and the start instruction, the document management server 3 stores the document data 31 in the memory unit, analyzes the details included in the instruction information corresponding to the workflow of which a start is instructed, and starts the procedure on the basis of the analysis result. That is, in order to perform the job of "approval" subsequent to the "draft", the document management server 3 transmits the document data 31 to the first terminal 5A used by the approver so as to determine whether the draft should be approved.

Next, the control unit of the first terminal 5A displays the received document data 31 on the display unit and the approver recognizes the details of the displayed document data 31, that is, the details of the draft to determine whether the details should be approved. When the approver inputs the approval result through the input unit, the control unit of the first terminal 5A transmits the approval result to the document management server 3.

When the draft is approved by the approver, the document management server 3 transmits an ordering instruction to the orderer as an "ordering" process subsequent to the job of "approval". On the other hand, when the draft is not approved by the approver, the document management server 3 informs the drafter of such indication.

When receiving the ordering instruction from the document management server 3, the orderer transmits an ordering paper to a provider by facsimile from the second multifunction device 4B. The ordering paper may be shaped as an ordering paper by the document management server 3 based on the details written in the draft. When the action of the orderer is not required, the document management server 3 may directly instruct the second multifunction device 4B to transmit the ordering paper by facsimile.

(Modified Example of Instruction Generating Picture)

A modified example of the instruction generating picture will be described now. FIG. 12 is a diagram illustrating a modified example of the instruction generating picture. In the instruction generating picture 13, the job panes 130A to 130C corresponding to the jobs are sequentially displayed from left to right in the processing procedures 134A to 134C and a left button 135 and a right button 136 for horizontally moving the job panes 130A to 130C to display the job panes continuous in the horizontal direction are displayed.

In the job panes 130A to 130C of the instruction generating picture 13, job selecting boxes 131A to 131C for selecting a job item, processing check boxes 132A to 132C for inputting the processing of the multifunction device corresponding to the job selected in the job selecting boxes 131A to 131C by the use of a check mark 137, and property panes 133A to 133C for inputting the detailed processes of documents of the multifunction device and detail information corresponding to the detailed processes when the check mark 137 is input to the processing check boxes 132A to 132C are displayed.

When a user selects a job item in the job selecting boxes 131A to 131C of the instruction generating picture 13, the receiving section 200 receives the selected job item as the job information. When the user inputs the check mark 137 to the processing check boxes 132A to 132C, the determining section 201 determines the detailed processes of documents and the multifunction device to perform the detailed processes based on the job information received by the receiving section 200, as described in the above-mentioned exemplary embodiment and displays the determination result in the property panes 133A to 133C. When the generating section 202 receives an instruction to generate the instruction information from the user, the generating section 202 generates the instruction information on the basis of the information input to the instruction generating picture 13.

(Another Exemplary Embodiments)

The invention is not limited to the above-mentioned exemplary embodiment, but may be modified in various forms without departing from the gist of the invention. For example, although it has been described in the above-mentioned exemplary embodiment that the workflow is prepared using the job controls from the instruction generating picture, the multifunction device controls may be arranged to prepare a workflow and then the job controls may be arranged to be correlated with the workflow of the multifunction device controls.

Although it has been described in the above-mentioned exemplary embodiment that the receiving section, the determining section, and the generating section of the instruction generating apparatus 2 are embodied by the control unit and the instruction generating program, all or a part thereof may be embodied by hardware such as an ASIC (Application Specific IC).

The instruction generating program used in the above-mentioned exemplary embodiment may be read into the memory units of the devices from a recording medium such as a CD-ROM or may be downloaded to the memory units of the devices from a server connected to a network such as the Internet.

The elements of the above-mentioned exemplary embodiment may be arbitrarily combined without departing from the gist of the invention.

What is claimed is:

1. An instruction generating apparatus comprising:
a receiving section that receives job information including a plurality of jobs determined in a given order by performing a first arrangement operation, in which information indicating a plurality of job items corresponding to the plurality of jobs is moved and arranged in a given order, and a second arrangement operation, in which information indicating a processing device is arranged in association with information indicating a job item including processing of a document, from among the information indicating the plurality of job items arranged in the given order,
wherein each of the jobs includes a process of the document by the processing device;
a determining section that receives a selection operation selecting the processing device, when the second arrangement operation is performed, detects a processing device which is capable of performing the job item including the processing of the document and which is selected in the selection operation, and determines the detected processing device as a processing device for processing the document; and
a generating section that generates instruction information based on the job information received by the receiving section, the instruction information including, in the given order, a plurality of sets of (i) a document corresponding to each job and (ii) detailed process of the document so as to instruct the processing device determined by the determining section to perform each document process,
wherein the job information includes condition information of each job,
wherein the determining section determines detailed processes to be performed by the processing device based on the condition information of each job and the processing device which is associated with the job item in the second arrangement operation.

2. The instruction generating apparatus according to claim 1,
wherein the determining section determines the detailed process of the document corresponding to one job of the plurality of the jobs based on the condition information of another job performed before or after the one job.

3. The instruction generating apparatus according to claim 1,
wherein the receiving section includes a display input section that arranges and displays job items corresponding to the plurality of jobs in the given order on a display screen, the display input section inputting the job item including the processing of the document by the processing device among the job items.

4. A non-transitory computer readable medium storing a program causing a computer to execute a process for generating instruction information, the process comprising:
receiving job information including a plurality of jobs determined in a given order, by performing a first arrangement operation, in which information indicating a plurality of job items corresponding to the plurality of jobs is moved and arranged in a given order, and a second arrangement operation, in which information indicating a processing device is arranged in association with information indicating a job item including processing of a document, from among the information indicating the plurality of job items arranged in the given order, wherein each of the jobs includes a process of the document by the processing device;

receiving a selection operation selecting the processing device when the second arrangement operation is performed, detecting a processing device which is capable of performing the job item including the processing of the document and which is selected in the selection operation; and determining the detected processing device as a processing device for processing the document; and generating instruction information based on the received job information, the instruction information including, in the given order, a plurality of a set of (i) a document corresponding to each job of the plurality of jobs and (ii) detailed process of the document so as to instruct the determined processing device to perform each document process;

wherein the job information includes condition information of each job, wherein detailed processes are determined to be performed by the processing device based on the condition information of each job and the processing device which is associated with the job item in the second arrangement operation.

5. The non-transitory computer readable medium according to claim 4, the process comprising:

determining the detailed process of the document corresponding to one job of the plurality of the jobs based on the condition information of another job performed before or after the one job.

6. The non-transitory computer readable medium according to claim 4, the process comprising:

arranging and displaying job items corresponding to the plurality of jobs in the given order on a display screen; and inputting the job item including the processing of the document by the processing device among the job items.

7. A document processing system comprising:

a processing device; and an instruction generating apparatus that includes:

a receiving section that receives job information including a plurality of jobs determined in a given order, by performing a first arrangement operation, in which information indicating a plurality of job items corresponding to the plurality of jobs is moved and arranged in a given order, and a second arrangement operation, in which information indicating a processing device is arranged in association with information indicating a job item including processing of a document, from among the information indicating the plurality of job items arranged in the given order, wherein each of the jobs includes a process of the document by the processing device;

a determining section that receives a selection operation selecting the processing device, when the second arrangement operation is performed, detects a processing device which is capable of performing the job item including the processing of the document and which is selected in the selection operation, and determines the detected processing device as a processing device for processing the document; and a generating section that generates instruction information based on the job information received by the receiving section, the instruction information including, in the given order, a plurality of a set of (i) a document corresponding to each job of the plurality of jobs and (ii) detailed process of the document so as to instruct the processing device determined by the determining section to perform each document process, wherein the processing device performs the document processes in an order of the plurality of jobs based on the instruction information generated by the instruction generating apparatus, wherein the job information includes condition information of each job, wherein the determining section determines detailed processes to be performed by the processing device based on the condition information of each job and the processing device which is associated with the job item in the second arrangement operation.

* * * * *